United States Patent [19]
Behrens et al.

[11] 3,874,771
[45] Apr. 1, 1975

[54] PHOTOGRAPHIC OBJECTIVE OF THE EXTENDED GAUSS TYPE

[75] Inventors: Karl-Heinrich Behrens, Konigsbronn; Erhard Glatzel, Heidenheim, both of Germany

[73] Assignee: Carl Zeiss Stiftung d/b/a Carl Zeiss Oberkochen, Germany

[22] Filed: June 25, 1973

[21] Appl. No.: 373,437

[30] Foreign Application Priority Data
June 30, 1972 Germany............................ 2232101

[52] U.S. Cl................................ 350/214, 350/215
[51] Int. Cl...................................... G02b 9/00
[58] Field of Search....................... 350/214, 215

[56] References Cited
UNITED STATES PATENTS
3,451,745  6/1969  Kazamaki et al. ............... 350/215
3,552,829  1/1971  Marquardt......................... 350/215
3,738,736  6/1973  Shimizu ............................ 350/215
3,743,387  7/1973  Nakagawa........................ 350/215

FOREIGN PATENTS OR APPLICATIONS
1,277,580  9/1968  Germany.......................... 350/215

Primary Examiner—Vincent P. McGraw
Assistant Examiner—Conrad Clark
Attorney, Agent, or Firm—Stonebraker & Shepard

[57] ABSTRACT

A high speed photographic objective of the extended Gauss type, having seven lenses arranged in two groups or members, the forward member having three lenses all air spaced from each other, the rear member having four lenses, two of which are cemented to each other, this cemented component and the other two lenses of the rear group all being air spaced from each other. Various limits are stated for the relationship of the various lenses to each other, and if these limits are followed in designing the lens, an objective of excellent quality can be obtained, and one of relatively high speed, such as f/1.5 or faster. Five specific examples are given.

6 Claims, 2 Drawing Figures

PHOTOGRAPHIC OBJECTIVE OF THE EXTENDED GAUSS TYPE

BACKGROUND OF THE INVENTION

Many photographic objectives of the extended Gauss type are known in the art. The present invention relates particularly to the sub-type or sub-genus in which there are seven individual lens elements, three disposed in front of and four disposed behind the central air space which serves as the location for the stop or diaphragm if one is used, the three lens elements of the front member being uncemented and air spaced from each other, the first, second, fifth, sixth, and seventh being collecting or positive lenses, whereas the third and fourth elements are diverging or negative lenses. The fourth and fifth elements are cemented to each other, all of the other components being air spaced.

The sub-type to which the present invention relates is further characterized by the fact that the refractive power $b_1$ of the first lens surface and the refractive power $b_3$ of the third lens surface are so related to each other that $b_3$ is greater than $1.55\ b_1$ and less than $3.50\ b_1$. Also the refractive power sum $\phi\ \beta$ of the surfaces surrounding the air space $\beta$ between the second element and the third element is negative.

Prior art to be considered in connection with the present invention includes German Pat. No. 1,268,873 (filed December 1967) and German Pat. No. 1,277,580 (filed January 1966) and its related British Pat. No. 1,120,335, and German published application (Auslegeschrift) 1,547,118 (filed September 1966). The following patents and publications may also be considered, although they fall outside of the sub-type above defined: German Pat. No. 1,170,157; German Pat. No. 1,269,385; German auslegeschrift 1,472,185; U.S. Pat. No. 2,735,340; and U.S. Pat. No. 2,895,379.

It is an object of the present invention to provide an improved photographic objective falling within the above mentioned sub-type or sub-genus of lenses of the extended Gauss type. This object is well attained by the present invention, and the lens of the present invention is a surprising and significant improvement and progressive further development of the Gauss sub-type mentioned.

SUMMARY OF THE INVENTION

When dealing with a photographic objective of the particular sub-type above mentioned, it is found that superior results can be achieved if the lens is so designed that all of the following conditions are simultaneously met. These conditions relate in part to the air lenses in the system, this expression meaning the air spaces between successive lens elements, some of which spaces form divergently acting or negative air lenses, and other spaces form collectingly acting or positive air lenses. The conditions to be simultaneously met are:

$A_1$. the surface refractive power sum $\phi\ \beta$ of the second inner air lens $\beta$ is, in its negative value, between the limits of 0.323 times and 0.543 times the equivalent refractive power $\Phi$ of the total objective.

$A_2$. The surface refractive power sum $\phi_{CS}$ of the third inner air lens constituting the central space or central vertex distance CS is also negative, and is so dimensioned that $\phi_{CS}$ is between the limits of 12.50 times and 8.090 times the above mentioned refractive power $\phi\ \beta$.

$B_1$. The refractive power sum $\phi\ \alpha$ of the two lens surfaces surrounding the air space $\alpha$ between the first and second lens elements is within the limits of 1,380 times and 1,925 times the equivalent refractive power $\Phi$ of the total objective.

$B_2$. The refractive power sum $\phi\ \delta$ of the two lens surfaces surrounding the air space between the last two lens elements (elements 6 and 7) is within the limits of 1.285 times and 1.805 times the above mentioned equivalent refractive power $\Phi$.

$B_3$. The sum of the surface refractive power sums $\phi\ \alpha + \phi\ \delta$ of these two air lenses $\alpha$ and $\delta$ is within the limits of 2.665 $\Phi$ and 3.730 $\Phi$.

C. The ratio or quotient Q of the first air lens refractive power $\phi\ \alpha$ divided by the last air lens refractive power $\phi\ \delta$ is within the limits of 1.310 and 0.944.

These desirable relationships explained in foregoing paragraph $A_1$ through C may be expressed more concisely by the following mathematical formulae. The right hand column indicates the corresponding paragraph in the above explanation.

| | | |
|---|---|---|
| $0.323\ \Phi < -\phi\beta$ | $< 0.543\ \Phi$ | ($A_1$) |
| $12.50\ \phi\ \beta > \phi_{CS}$ | $> 8.090\ \phi\beta$ | ($A_2$) |
| $1.380\ \Phi < \phi\alpha$ | $< 1.925\ \Phi$ | ($B_1$) |
| $1.285\ \Phi < \phi\delta$ | $< 1.805\ \Phi$ | ($B_2$) |
| $2.665\ \Phi < (\phi\ \alpha + \phi\ \delta) < 3.730\ \Phi$ | | ($B_3$) |
| $1.310 > Q$ | $> 0.944$ | (C) |

In the foregoing table, as already explained, the quotient $Q = \phi\ \alpha \div \phi\ \delta$, and $\Phi$ signifies the paraxial equivalent refractive power of the total objective or entire lens system.

DESCRIPTION OF THE PREFERRED EMBODIMENTS

According to this invention, the objective has seven individual lens elements arranged in the manner above set forth in the introductory description of the sub-type to which the invention relates, and having the refractive powers above mentioned in connection with the discussion of the sub-type. In addition, the refractive powers are so distributed as to comply with all of the conditions stated in the above paragraphs respectively identified as $A_1$, $A_2$, $B_1$, $B_2$, $B_3$, and C. This distribution of the refractive powers is found to give a surprising and significant increase in the power of the lens system, particularly in the lateral parts of the field of view.

The dimensioning of the lens elements in accordance with the above conditions $A_1$ and $A_2$ gives a partial relief of the overcorrecting effect of the central air lens by a balanced shifting of this effect to the preceding air lens whereby the spherical aberrations of higher order can be reduced in a particularly simple manner. By complying with the conditions $B_1$, $B_2$, and $B_3$, in combination with each other and with the conditions $A_1$ and A₂, the betterment or enhancement of the imaging power beyond the central field of view is extended to the margin of the image area, giving a very significant increase in the imaging power not only in the near-axial area but also in the zonal and marginal image area, so that the total useful size can be substantially increased or opened up according to the wishes of the operating photographer.

Moreover, at the same time, by complying with the condition C with regard to the quite specific relative distribution of the refractive powers of the first air lens $\alpha$ and the last air lens $\beta$ the asymmetrical error portions of the coma errors of wide-open inclined beams in the lateral image field are strongly reduced. Thus by the concurrent compliance with all of these conditions $A_1$ through C, a significantly improved lens system useful as a photographic objective is produced, with significant increase in the imaging power without the need for using extreme shapes or aspherical surfaces or for using extreme glass types.

Five specific embodiments of lens systems or objectives according to the present invention are set forth in the five tables of data which follow. In all of these tables, linear dimensions are given with reference to the equivalent focal length of the objective as a unit. That is, the linear dimensions of thicknesses, spacings, and radii are not stated as fixed linear units such as millimeters, but are stated as proportions of the equivalent focal length (F) of the entire system, the equivalent focal length being regarded as unity or 1.0000.

Figure 1:
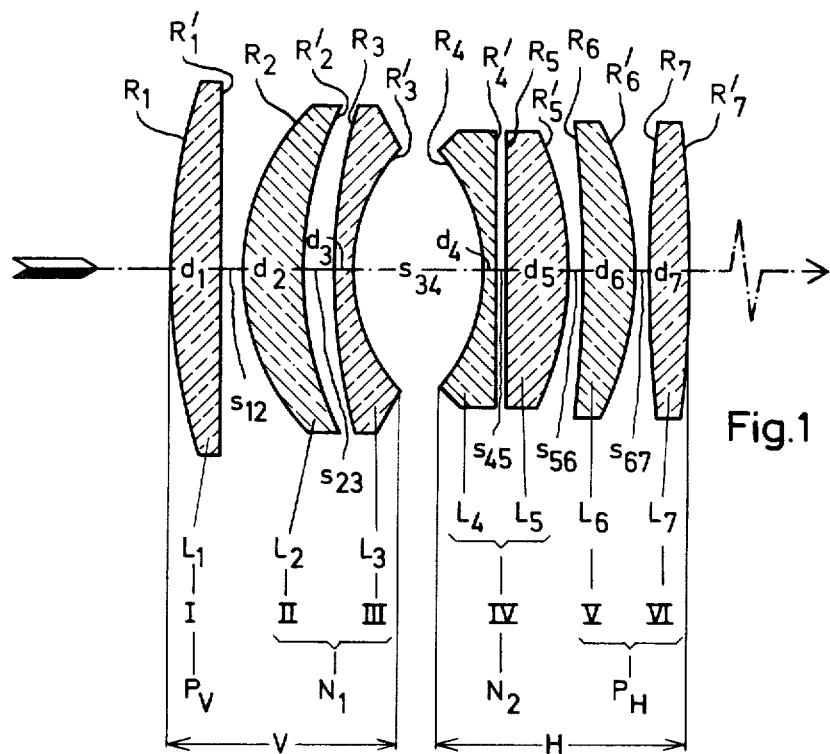
FIG. 1 is a lens diagram illustrating a lens according to a preferred embodiment of the invention.

As customary in patent literature and as seen at a glance in FIG. 1, the lens elements are consecutively numbered from front to rear and are designated as $L_1$, $L_2$, $L_3$, etc., to $L_7$. For brevity, the lens elements may at times be referred to merely by their respective numerals 1, 2, etc., without using the letter L. In the data tables, the radii of curvature of the respective lens surfaces are indicated by the letter R with a subscript indicating the number of the particular lens element, with a prime for the rear surface of the element, the unprimed letter indicating the front surface. Thus, for example, $R_3$ indicates the front surface of lens element $L_3$, and $R'_3$ indicates the rear surface of the same lens element. This will be readily apparent from studying the data tables in connection with the illustration in FIG. 1.

Figure 2:
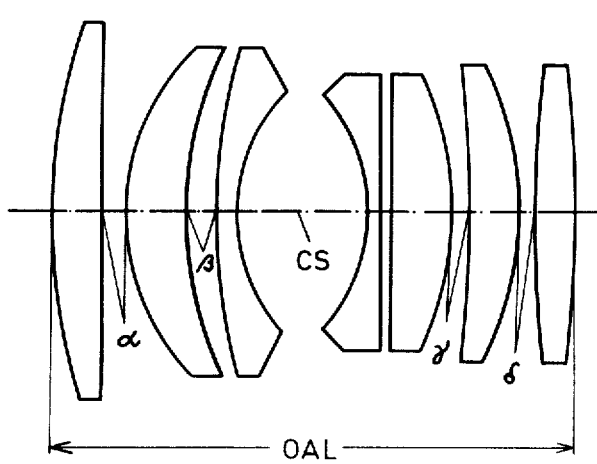
FIG. 2 is a similar diagram in somewhat simplified form, showing particularly the reference characters used for designating the various air lenses, formed by the air spaces between adjacent lenses.

The axial thicknesses of the respective lens elements are indicated, both in the tables and in FIG. 1, by the letter $d$ with a subscript identifying the particular lens element. The axial spacings between lens elements are indicated by the letter s with a subscript indicating the number of the lens element in front of and the lens element behind the particular space. Thus for example $s_{23}$ indicates the space between element 2 and element 3. In addition, the spaces between successive lens elements, when considered from the standpoint of forming air lenses rather than from the standpoint of axial spacing, are designated by consecutive Greek letters as shown in FIG. 2, except for the air lens formed by the central space between the front member and the rear member of the lens, which central space is indicated in FIG. 2 (and in various parts of the specification) as CS. The over-all length of the complete lens, from the front vertex of element 1 to the rear vertex of element 7, may be designated as OAL, as shown at the bottom of FIG. 2.

The numerical tables also give, in the column headed N, the index of refraction of the glass used for each lens element. If the objective is intended to be used only for a very narrow spectral range, the indicated refractive index relates to this very narrow range. When the objective is to be used for imaging objects covering a substantial spectral range, then an achromatism over the wider spectral range will be required, for which purpose the glasses are selected in a manner known per se, so as to have indices of refraction and dispersive indices (Abbe numers) appropriate to the desired spectral range, as well understood by those skilled in the art. In the course of the initial design or rough design of an objective according to the present invention, it is satisfactory to use a standard refractive index, such as the index based on the yellow $d$-line of the helium spectrum, having a wave length of 5876 Angstrom units. The refractive index based on this line is shown in many glass catalogues of manufacturers of optical glasses.

In Flg. 1, the light is assumed to come from the left toward the right, in the conventional manner normally used in lens diagrams. In the tables, plus values of R indicates surfaces convex toward the incident light, and minus values of R indicates surfaces concave toward the incident light. Infinity values of R indicate plane surfaces. As above indicated, the column headed N in the tables gives the index of refraction. The Abbe number or index of dispersion is given in some of the tables in the column headed V, but is omitted in other tables as being unnecessary.

In the lower part of FIG. 1 various reference characters are used which will now be explained. The Roman numerals are employed for numbering air spaced components consecutively from front to rear. Since each individual lens element is air spaced except for elements 4 and 5 which are cemented together, it follows that elements 4 and 5 together constitute air spaced component IV, while lens element 6 thus becomes component V, and element 7 becomes component VI. The front member of the system, consisting of the components I, II, and III collectively, is designated by the letter V, standing for the German word "Vorderglied." The rear member, consisting of the components IV, V, and VI collectively, is designated by the letter H, standing for the German word "Hinterglied."

As further shown near the bottom of FIG. 1, the front member V may be said to be made up of a front positive lens $P_1$ consisting only of the lens element $L_1$ or component I, plus a negative combination $N_1$ made up of components II and III (lens elements $L_2$ and $L_3$). The rear member H of the system may be said to be made up of a negative combination $N_2$ (component IV, lens elements $L_4$ and $L_5$) plus a positive combination $P_H$ made up of components V and VI (lens elements $L_6$ and $L_7$) having at least two collecting lenses spaced in air.

From the tables giving numerical data for the five specific examples, it can be seen that the front positive $P_1$ can be given a strongly unequal-sided biconvex design or a meniscusshaped design, and also, as the inner limit case thereof, can be given the form of a planoconvex lens. Also, the second negative combination $N_2$ can have both its lenses $L_4$ and $L_5$ of meniscus shape and respectively biconcave and biconvex. Moreover, the adjacent surfaces of the two lens elements $L_4$ and $L_5$ constituting the negative combination $N_2$ can be designed as a plane surface pair rather than having the curved shapes given in the various tables. The possibility of using plane surfaces for the junction between the elements $L_4$ and $L_5$ is believed to be so obvious to a skilled lens designer once he has familiarized himself with the present disclosure, that it is deemed unnecessary to include a specific example wherein the surfaces $R'_4$ and $R_5$ are plane.

A few introductory remarks regarding the various specific examples will be given, before reaching the numerical tables themselves.

Example 1 (numerical data in Table 1) relates to a rough form of an objective according to this invention, which has been pre-corrected mono-chromatically in the range of the third order. It has a relative aperture of f/1.5. The initial positive portion $P_1$ is of biconvex shape. In the numerical data in Table 1, the thicknesses and spacings and the radii are carried out to three decimal places, but it is desired to add that the space $s_{12}$ between the first two lens elements preferably has an exact value of 0.00098925 F, and the radius $R'_7$ preferably has an exact value of $-2.20501777$ F.

In example 2 (data in Table 2) the front positive part $P_1$ or $L_1$ is designed as a plano-convex lens. This is also a rough form, pre-corrected mono-chromatically, and gives an aperture of f/1.5.

Example 3 (data in Table 3) also represents a monochromatically pre-corrected rough form in which the inner neighboring surface pair ($R'_4$ and $R_5$) in the negative combination $N_2$ which follows the stop is provided with a positive sign of direction.

Both example 4 (data in Table 4) and example 5 (data in Table 5) are fine-corrected embodiments of the invention, as distinguished from the rough forms in the three preceding examples. Both of these fine-corrected forms have a relative aperture of f/1.4 and are provided for use with ordinary color photography. Accordingly, the glass properties are shown in the tables not only by their indices of refraction but also by their indices of color dispersion or Abbe numbers, the latter being in the columns headed V.

In all examples, the equivalent focal length of the total objective is F = 1.0000, and this is the unit to which all of the linear dimensions are related.

Table 1

| Lens | Radii | (Example 1) Thicknesses and Spacings | N |
|---|---|---|---|
| $L_1$ | $R_1 = +1.160$ | $d_1 = 0.093$ | $n_1 = 1.717$ |
|  | $R'_1 = -600.0$ | $s_{12} = 0.001$ (air lens $\alpha$) |  |
| $L_2$ | $R_2 = +0.495$ | $d_2 = 0.130$ | $n_2 = 1.784$ |
|  | $R'_2 = +0.915$ | $s_{23} = 0.027$ (air lens $\beta$) |  |
| $L_3$ | $R_3 = +1.600$ | $d_3 = 0.045$ | $n_3 = 1.699$ |
|  | $R'_3 = +0.345$ | $s_{34} = s_{CS} = 0.248$ (air lens CS) |  |
| $L_4$ | $R_4 = -0.360$ | $d_4 = 0.025$ | $n_4 = 1.762$ |
|  | $R'_4 = -8.600$ | $s_{45} = 0.00$ (cemented) |  |
| $L_5$ | $R_5 = -8.600$ | $d_5 = 0.110$ | $n_5 = 1.788$ |
|  | $R'_5 = -0.645$ | $s_{56} = 0.001$ (air lens $\gamma$) |  |
| $L_6$ | $R_6 = -8.600$ | $d_6 = 0.087$ | $n_6 = 1.757$ |
|  | $R'_6 = -0.605$ | $s_{67} = 0.005$ (air lens $\delta$) |  |
| $L_7$ | $R_7 = +8.600$ | $d_7 = 0.053$ | $n_7 = 1.749$ |
|  | $R'_7 = -2.205$ |  |  |
| F = 1.0000 |  | $s'\infty = 0.703$ | OAL = 0.825 |

Table 2

| Lens | Radii | (Example 2) Thicknesses and Spacings | N |
|---|---|---|---|
| $L_1$ | $R_1 = +1.100$ | $d_1 = 0.100$ | $n_1 = 1.720$ |
|  | $R'_1 = \infty$ (plane) | $s_{12} = 0.002$ |  |
| $L_2$ | $R_2 = +0.520$ | $d_2 = 0.133$ | $n_2 = 1.780$ |
|  | $R'_2 = +1.100$ | $s_{23} = 0.030$ |  |
| $L_3$ | $R_3 = +2.020$ | $d_3 = 0.045$ | $n_3 = 1.715$ |
|  | $R'_3 = +0.350$ | $s_{34} = s_{CS} = 0.232$ |  |
| $L_4$ | $R_4 = -0.365$ | $d_4 = 0.030$ | $n_4 = 1.785$ |
|  | $R'_4 = -7.500$ | $s_{45} = 0.00$ |  |
| $L_5$ | $R_5 = -7.500$ | $d_5 = 0.115$ | $n_5 = 1.780$ |
|  | $R'_5 = -0.600$ | $s_{56} = 0.002$ |  |
| $L_6$ | $R_6 = -3.600$ | $d_6 = 0.090$ | $n_6 = 1.745$ |
|  | $R'_6 = -0.620$ | $s_{67} = 0.002$ |  |
| $L_7$ | $R_7 = +3.600$ | $d_7 = 0.059$ | $n_7 = 1.745$ |
|  | $R'_7 = -2.45439$ |  |  |
| F = 1.0000 |  | $s'\infty = 0.6996$ | OAL = 0.840 |

Table 3

| Lens | Radii | (Example 3) Thicknesses and Spacings | N |
|---|---|---|---|
| $L_1$ | $R_1 = +0.880$ | $d_1 = 0.1000$ | $n_1 = 1.720$ |
|  | $R'_1 = +5.880$ | $s_{12} = 0.0010$ |  |
| $L_2$ | $R_2 = +0.430$ | $d_2 = 0.1000$ | $n_2 = 1.790$ |
|  | $R'_2 = +0.650$ | $s_{23} = 0.0280$ |  |
| $L_3$ | $R_3 = +0.950$ | $d_3 = 0.0240$ | $n_3 = 1.690$ |
|  | $R'_3 = +0.307$ | $s_{34} = s_{CS} = 0.2870$ |  |
| $L_4$ | $R_4 = -0.347$ | $d_4 = 0.0240$ | $n_4 = 1.730$ |
|  | $R'_4 = +7.500$ | $s_{45} = 0.00$ |  |
| $L_5$ | $R_5 = +7.500$ | $d_5 = 0.1000$ | $n_5 = 1.790$ |
|  | $R'_5 = -0.605$ | $s_{56} = 0.0030$ |  |
|  | $R_6 = -1.750$ |  |  |

Referring to the foregoing specific examples in tables 1 through 5, and referring to the conditions or requirements set forth in the foregoing paragraphs identified as $A_1$, $A_2$, $B_1$, $B_2$, $B_3$, and C, it is desired to show how each of the specific examples fulfills those conditions. The values referred to in the paragraphs $A_1$ through C, for each of the objectives in the five specific examples, are given in the following table.

Table 3-Continued

| Lens | Radii | (Example 3) Thicknesses and Spacings | N |
|---|---|---|---|
| $L_6$ | | $d_6 = 0.1000$ | $n_6 = 1.790$ |
| | $R'_6 = -0.567$ | | |
| | | $s_{67} = 0.0030$ | |
| | $R_7 = +3.1993$ | $d_7 = 0.0545$ | $n_7 = 1.740$ |
| $L_7$ | $R'_7 = -2.6876$ | | |
| $F = 1.0000$ | | $s'\infty = 0.7111$ | OAL = 0.8245 |

Table 4

| Lens | Radii | (Example 4) Thicknesses and Spacings | N | V |
|---|---|---|---|---|
| $L_1$ | $R_1 = +1.03793$ | $d_1 = 0.098094$ | 1.71700 | 47.99 |
| | $R'_1 = +10.4242$ | | | |
| | | $s_{12} = 0.010372$ | | |
| $L_2$ | $R_2 = +0.43740$ | $d_2 = 0.107946$ | 1.78831 | 47.37 |
| | $R'_2 = +0.74461$ | | | |
| | | $s_{23} = 0.026849$ | | |
| $L_3$ | $R_3 = +1.07497$ | $d_3 = 0.024892$ | 1.68893 | 31.17 |
| | $R'_3 = +0.31467$ | | | |
| | | $CS = s_{34} = 0.272222$ | | |
| $L_4$ | $R_4 = -0.35410$ | $d_4 = 0.026556$ | 1.72830 | 28.68 |
| | $R'_4 = +24.4921$ | | | |
| | | $s_{45} = 0.00$ | | |
| $L_5$ | $R_5 = +24.4921$ | $d_5 = 0.101507$ | 1.78831 | 47.37 |
| | $R'_5 = -0.58788$ | | | |
| | | $s_{56} = 0.003249$ | | |
| $L_6$ | $R_6 = -2.77625$ | $d_6 = 0.090000$ | 1.78831 | 47.37 |
| | $R'_6 = -0.61318$ | | | |
| | | $s_{67} = 0.008258$ | | |
| $L_7$ | $R_7 = +3.50851$ | $d_7 = 0.054188$ | 1.74400 | 44.77 |
| | $R'_7 = -4.03355$ | | | |
| $F = 1.00000$ | | $s'\infty = 0.69672$ | | OAL = 0.824133 |

Table 5

| Lens | Radii | (Example 5) Thicknesses and Spacings | N | V |
|---|---|---|---|---|
| $L_1$ | $R_1 = +0.88904$ | $d_1 = 0.101821$ | 1.71700 | 47.99 |
| | $R'_1 = +5.77321$ | | | |
| | | $s_{12} = 0.001177$ | | |
| $L_2$ | $R_2 = +0.43607$ | $d_2 = 0.097113$ | 1.78831 | 47.37 |
| | $R'_2 = +0.68124$ | | | |
| | | $s_{23} = 0.031782$ | | |
| $L_3$ | $R_3 = +0.94172$ | $d_3 = 0.023739$ | 1.68893 | 31.17 |
| | $R'_3 = +0.30648$ | | | |
| | | $CS = s_{34} = 0.285453$ | | |
| $L_4$ | $R_4 = -0.34637$ | $d_4 = 0.022954$ | 1.72830 | 28.68 |
| | $R'_4 = +7.48043$ | | | |
| | | $s_{45} = 0.00$ | | |
| $L_5$ | $R_5 = +7.48043$ | $d_5 = 0.102998$ | 1.78831 | 47.37 |
| | $R'_5 = -0.60714$ | | | |
| | | $s_{56} = 0.005689$ | | |
| $L_6$ | $R_6 = -1.74852$ | $d_6 = 0.087696$ | 1.78831 | 47.37 |
| | $R'_6 = -0.56500$ | | | |
| | | $s_{67} = 0.002550$ | | |
| $L_7$ | $R_7 = +3.29359$ | $d_7 = 0.056698$ | 1.74400 | 44.77 |
| | $R'_7 = -2.61616$ | | | |
| $F = 1.00000$ | | $s'\infty = +0.70993$ | | OAL = 0.819670 |

Table 6

| Example | $A_1$ | $A_2$ | C |
|---|---|---|---|
| 1 | $-0.4200\,\Phi$ | $9.8647\,\phi\beta$ | 1.1843 |
| 2 | $-0.3551\,\Phi$ | $11.8085\,\phi\beta$ | 1.0649 |
| 3 | $-0.4891\,\Phi$ | $8.8971\,\phi\beta$ | 1.0555 |
| 4 | $-0.4178\,\Phi$ | $10.1629\,\phi\beta$ | 1.1575 |
| 5 | $-0.4256\,\Phi$ | $10.2221\,\phi\beta$ | 1.0385 |

| Example | $B_1$ | $B_2$ | $B_3$ |
|---|---|---|---|
| 1 | $+1.5850\,\Phi$ | $+1.3383\,\Phi$ | $+2.9233\,\Phi$ |
| 2 | $+1.5000\,\Phi$ | $+1.4086\,\Phi$ | $+2.9086\,\Phi$ |
| 3 | $+1.7148\,\Phi$ | $+1.6246\,\Phi$ | $+3.3394\,\Phi$ |
| 4 | $+1.7335\,\Phi$ | $+1.4977\,\Phi$ | $+3.2312\,\Phi$ |
| 5 | $+1.6836\,\Phi$ | $+1.6211\,\Phi$ | $+3.3047\,\Phi$ |

It will be seen that in all of the five specific examples, all of the values come well within the ranges specified in paragraphs $A_1$ through C. However, it may be added for the benefit of those wishing to design other specific examples of lenses in accordance with the teaching of the present invention, that a conventional tolerance range of about plus or minus 10 percent above or below the range limits specified in foregoing paragraphs $A_1$ through C is ordinarily acceptable.

What is claimed is:

1. A photographic objective of the extended Gauss type comprising seven lens elements arranged three in front of a stop space and four behind said stop space, the elements, as numbered consecutively from front to rear, and their relationship to each other, having substantially the characteristics set forth below:

Elements 1, 2, and 3 are uncemented individual elements;
Elements 1, 2, 5, 6, and 7 are collecting lenses;
Elements 3 and 4 are diverging lenses;
The refractive power of the third surface (front surface of element 2) is within the range limits of 1.55 and 3.50 times the refractive power of the first lens surface (front surface of element 1);
The refractive power sum of the surfaces surrounding the second air lens formed by the air space between elements 2 and 3 (rear surface of element 2 and front surface of element 3) is negative; and also $A_1$. the surface refractive power sum of said second air lens according to its negative value is within the range limits of 0.323 and 0.543 times the equivalent refractive power of the entire objective;

$A_2$. the surface refractive power sum of the third air lens formed by the air space between elements 3 and 4 is also negative and is within the range limits of 12.50 and 8.090 times the refractive power of said second air lens;

$B_1$. the refractive power sum of the two lens surfaces surrounding the first air lens formed by the air space between elements 1 and 2 is within the range limits of 1.380 and 1.925 times the eequivalent refractive power of the entire objective;

$B_2$. the refractive power sum of the two lens surfaces surrounding the rearmost air lens formed by the air space between elements 6 and 7 is within the range limits of 1.285 and 1.805 times the equivalent refractive power of the entire objective;

$B_3$. the sum of the refractive power sums of said first air lens and said rearmost air lens is within the range limits of 2.665 and 3.730 times the equivalent refractive power of the entire objective; and C. the quotient of the refractive power sum of said first air lens divided by the refractive power sum of said rearmost air lens is within the range limits of 1.310 and 0.944.

2. An objective as defined in claim 1, wherein the characteristics of the lens elements and their spatial relationship to each other are substantially in the proportions indicated by the data in the following table:

| Lens | Radii | Thicknesses and Spacings | N |
|---|---|---|---|
| $L_1$ | $R_1 = +1.160$ | $d_1 = 0.093$ | $n_1 = 1.717$ |
|  | $R'_1 = -600.0$ |  |  |
|  |  | $s_{12} = 0.001$ (air lens $\alpha$) |  |
| $L_2$ | $R_2 = +0.495$ | $d_2 = 0.130$ | $n_2 = 1.784$ |
|  | $R'_2 = +0.915$ |  |  |
|  |  | $s_{23} = 0.027$ (air lens $\beta$) |  |
| $L_3$ | $R_3 = +1.600$ | $d_3 = 0.045$ | $n_3 = 1.699$ |
|  | $R'_3 = +0.345$ |  |  |
|  |  | $s_{34} = s_{45} = 0.248$ (air lens CS) |  |
| $L_4$ | $R_4 = -0.360$ | $d_4 = 0.025$ | $n_4 = 1.762$ |
|  | $R'_4 = -8.600$ |  |  |
|  |  | $s_{45} = 0.00$ (cemented) |  |
| $L_5$ | $R_5 = -8.600$ | $d_5 = 0.110$ | $n_5 = 1.788$ |
|  | $R'_5 = -0.645$ |  |  |
|  |  | $s_{56} = 0.001$ (air lens $\gamma$) |  |
| $L_6$ | $R_6 = -8.600$ | $d_6 = 0.087$ | $n_6 = 1.757$ |
|  | $R'_6 = -0.605$ |  |  |
|  |  | $s_{67} = 0.005$ (air lens $\delta$) |  |
| $L_7$ | $R_7 = +8.600$ | $d_7 = 0.053$ | $n_7 = 1.749$ |
|  | $R'_7 = -2.205$ |  |  | wherein all linear dimensions of radii, thicknesses, and spacings are expressed in proportion to the equivalent focal length of the entire objective, which is considered as unity, and the reference letters and numerals have the respective meanings explained in the foregoing specification.

3. An objective as defined in claim 1, wherein the characteristics of the lens elements and their spatial relationship to each other are substantially in the proportions indicated by the data in the following table:

| Lens | Radii | Thicknesses and Spacings | N |
|---|---|---|---|
| $L_1$ | $R_1 = +1.100$ | $d_1 = 0.100$ | $n_1 = 1.720$ |
|  | $R'_1 = \infty$ (plane) | $s_{12} = 0.002$ |  |
| $L_2$ | $R_2 = +0.520$ | $d_2 = 0.133$ | $n_2 = 1.780$ |
|  | $R'_2 = +1.100$ | $s_{23} = 0.030$ |  |
| $L_3$ | $R_3 = +2.020$ | $d_3 = 0.045$ | $n_3 = 1.715$ |
|  | $R'_3 = +0.350$ | $s_{34} = s_{cs} = 0.232$ |  |
| $L_4$ | $R_4 = -0.365$ | $d_4 = 0.030$ | $n_4 = 1.785$ |
|  | $R'_4 = -7.500$ | $s_{45} = 0.00$ |  |
| $L_5$ | $R_5 = -7.500$ | $d_5 = 0.115$ | $n_5 = 1.780$ |
|  | $R'_5 = -0.600$ | $s_{56} = 0.002$ |  |
| $L_6$ | $R_6 = -3.600$ | $d_6 = 0.090$ | $n_6 = 1.745$ |
|  | $R'_6 = -0.620$ | $s_{67} = 0.002$ |  |
| $L_7$ | $R_7 = +3.600$ | $d_7 = 0.059$ | $n_7 = 1.745$ |
|  | $R'_7 = -2.45439$ |  |  | wherein all linear dimensions of radii, thicknesses, and spacings are expressed in proportion to the equivalent focal length of the entire objective, which is considered as unity, and the reference letters and numerals have the respective meanings explained in the foregoing specification.

4. An objective as defined in claim 1, wherein the characteristics of the lens elements and their spatial relationship to each other are substantially in the proportions indicated by the data in the following table:

| Lens | Radii | Thicknesses and Spacings | N |
|---|---|---|---|
| $L_1$ | $R_1 = +0.880$ | $d_1 = 0.10$ | $n_1 = 1.720$ |
|  | $R'_1 = +5.880$ | $s_{12} = 0.0010$ |  |
| $L_2$ | $R_2 = +0.430$ | $d_2 = 0.1000$ | $n_2 = 1.790$ |
|  | $R'_2 = +0.650$ | $s_{23} = 0.0280$ |  |
| $L_3$ | $R_3 = +0.950$ | $d_3 = 0.0240$ | $n_3 = 1.690$ |
|  | $R'_3 = +0.307$ | $s_{34} = s_{cs} = 0.2870$ |  |
| $L_4$ | $R_4 = -0.347$ | $d_4 = 0.0240$ | $n_4 = 1.730$ |
|  | $R'_4 = +7.500$ | $s_{45} = 0.00$ |  |
| $L_5$ | $R_5 = +7.500$ | $d_5 = 0.1000$ | $n_5 = 1.790$ |
|  | $R'_5 = -0.605$ | $s_{56} = 0.0030$ |  |
| $L_6$ | $R_6 = -1.750$ | $d_6 = 0.1000$ | $n_6 = 1.790$ |
|  | $R'_6 = -0.567$ | $s_{67} = 0.0030$ |  |
| $L_7$ | $R_7 = +3.1993$ | $d_7 = 0.0545$ | $n_7 = 1.740$ |
|  | $R'_7 = -2.6876$ |  |  | wherein all linear dimensions of radii, thicknesses, and spacings are expressed in proportion to the equivalent focal length of the entire objective, which is considered as unity, and the reference letters and numerals have the respective meanings explained in the foregoing specification.

5. An objective as defined in claim 1, wherein the characteristics of the lens elements and their spatial relationship to each other are substantially in the proportions indicated by the data in the following table:

| Lens | Radii | Thicknesses and Spacings | N | V |
|---|---|---|---|---|
| $L_1$ | $R_1 = +1.03793$ | $d_1 = 0.098094$ | 1.71700 | 47.99 |
|  | $R'_1 = +10.4242$ | $s_{12} = 0.010372$ |  |  |
| $L_2$ | $R_2 = +0.43740$ | $d_2 = 0.107946$ | 1.78831 | 47.37 |
|  | $R'_2 = +0.74461$ | $s_{23} = 0.026849$ |  |  |
| $L_3$ | $R_3 = +1.07497$ | $d_3 = 0.024892$ | 1.68893 | 31.17 |
|  | $R'_3 = +0.31467$ | $CS = s_{34} = 0.272222$ |  |  |
| $L_4$ | $R_4 = -0.35410$ | $d_4 = 0.026556$ | 1.72830 | 28.68 |
|  | $R'_4 = +24.4921$ | $s_{45} = 0.00$ |  |  |
| $L_5$ | $R_5 = +24.4921$ | $d_5 = 0.101507$ | 1.78831 | 47.37 |
|  | $R'_5 = -0.58788$ | $s_{56} = 0.003249$ |  |  |
| $L_6$ | $R_6 = -2.77625$ | $d_6 = 0.090000$ | 1.78831 | 47.37 |
|  | $R'_6 = -0.61318$ | $s_{67} = 0.008258$ |  |  |
| $L_7$ | $R_7 = +3.50851$ | $d_7 = 0.054188$ | 1.74400 | 44.77 |
|  | $R'_7 = -4.03355$ |  |  |  | wherein all linear dimensions of radii, thicknesses, and spacings are expressed in proportion to the equivalent focal length of the entire objective, which is considered as unity, and the reference letters and numerals have

| Lens | Radii | Thicknesses and Spacings | N | V |
|---|---|---|---|---|
| $L_1$ | $R_1 = +0.88904$ | $d_1 = 0.101821$ | 1.71700 | 47.99 |
| | $R'_1 = +5.77321$ | $s_{12} = 0.001177$ | | |
| $L_2$ | $R_2 = +0.43607$ | $d_2 = 0.097113$ | 1.78831 | 47.37 |
| | $R'_2 = +0.68124$ | $s_{23} = 0.031782$ | | |
| $L_3$ | $R_3 = +0.94172$ | $d_3 = 0.023739$ | 1.68893 | 31.17 |
| | $R'_3 = +0.30648$ | $CS = s_{34} = 0.285453$ | | |
| $L_4$ | $R_4 = -0.34637$ | $d_4 = 0.022954$ | 1.72830 | 28.68 |
| | $R'_4 = +7.48043$ | $s_{45} = 0.00$ | | |
| $L_5$ | $R_5 = +7.48043$ | $d_5 = 0.102998$ | 1.78831 | 47.37 |
| | $R'_5 = -0.60714$ | $s_{56} = 0.005689$ | | |
| $L_6$ | $R_6 = -1.74852$ | $d_6 = 0.087696$ | 1.78831 | 47.37 |
| | $R'_6 = -0.56500$ | $s_{67} = 0.002550$ | | |
| $L_7$ | $R_7 = +3.29359$ | $d_7 = 0.056698$ | 1.74400 | 44.77 |
| | $R'_7 = -2.61616$ | | | | the respective meanings explained in the foregoing specification.

6. An objective as defined in claim 1, wherein the characteristics of the lens elements and their spatial relationship to each other are substantially in the proportions indicated by the data in the following table: wherein all linear dimensions of radii, thicknesses, and spacings are expressed in proportion to the equivalent focal length of the entire objective, which is considered as unity, and the reference letters and numerals have the respective meanings explained in the foregoing specification.

* * * * *